(12) United States Patent
Pelletier et al.

(10) Patent No.: US 8,873,474 B2
(45) Date of Patent: Oct. 28, 2014

(54) METHOD AND MOBILE TERMINAL PROVIDING PRIORITY-BASED UPLINK SCHEDULING INFORMATION

(75) Inventors: Ghyslain Pelletier, Boden (SE); Magnus Lindström, Spånga (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1229 days.

(21) Appl. No.: 12/578,762

(22) Filed: Oct. 14, 2009

(65) Prior Publication Data

US 2010/0098011 A1   Apr. 22, 2010

Related U.S. Application Data

(60) Provisional application No. 61/106,360, filed on Oct. 17, 2008.

(51) Int. Cl.
H04W 4/00 (2009.01)
H04W 72/12 (2009.01)

(52) U.S. Cl.
CPC ...... *H04W 72/1242* (2013.01); *H04W 72/1284* (2013.01)
USPC ........................................ 370/329

(58) Field of Classification Search
USPC ........................................ 370/329
See application file for complete search history.

(56) References Cited

U.S. PATENT DOCUMENTS

| | | | | |
|---|---|---|---|---|
| 7,953,064 B2 * | 5/2011 | Ahluwalia | | 370/349 |
| 8,165,083 B2 * | 4/2012 | Tani et al. | | 370/329 |
| 8,243,660 B2 * | 8/2012 | Jeong et al. | | 370/329 |
| 2005/0207411 A1 * | 9/2005 | Ota et al. | | 370/389 |
| 2006/0168217 A1 * | 7/2006 | Anand | | 709/225 |
| 2008/0222640 A1 * | 9/2008 | Daly et al. | | 718/103 |
| 2008/0267126 A1 * | 10/2008 | Vujcic et al. | | 370/330 |
| 2009/0005029 A1 * | 1/2009 | Wang et al. | | 455/423 |
| 2009/0116434 A1 * | 5/2009 | Lohr et al. | | 370/329 |
| 2009/0197610 A1 * | 8/2009 | Chun et al. | | 455/450 |
| 2010/0040028 A1 * | 2/2010 | Maheshwari et al. | | 370/336 |
| 2010/0077100 A1 * | 3/2010 | Hsu et al. | | 709/234 |
| 2011/0039568 A1 * | 2/2011 | Zhang et al. | | 455/452.1 |

OTHER PUBLICATIONS

Phillips, "Triggering of Scheduling Request", 3GPP TSG-RAN WG2#62, Apr. 28, 2008, Kansas City, USA.*
LG Eelectronic Inc, "Issues with Scheduling Request Procedure". 3GPP TSG-RAN WG2 #61 RS-081083, Feb. 11, 2008, Section 2.2.*
Phillips, Triggering of Scheduling Request, 3GPP TSG-RAN WG2#62, May 5, 2009, Kansas City, USA.
Phillips, Triggering of Scheduling Request, 3GPP TSG-RAN WG2#61bis, Mar. 31, 2009, Shenzhen, China.

* cited by examiner

*Primary Examiner* — Guang Li

(57) ABSTRACT

A method and mobile terminal for providing uplink scheduling information to a scheduler in a wireless telecommunication system. When a logical channel having data available to transmit triggers a buffer status report, the mobile terminal determines whether a priority level associated with the logical channel exceeds a predefined threshold. If so, the mobile terminal performs a scheduling request procedure with the scheduler. If not, the mobile terminal delays the scheduling request procedure until a predefined timing event has occurred. The predefined timing event may be at least one of expiration of a timer, a radio bearer associated with the logical channel becoming active, and if the scheduling request procedure is being performed using a contention-based random access, contention resolution succeeding for the mobile terminal.

13 Claims, 7 Drawing Sheets

METHOD AND MOBILE TERMINAL PROVIDING PRIORITY-BASED UPLINK SCHEDULING INFORMATION

CROSS-REFERENCE TO RELATED APPLICATIONS:

This application claims the benefit of U.S. Provisional Application No. 61/106,360 filed Oct. 17, 2008.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to wireless telecommunication systems. More particularly, and not by way of limitation, the invention is directed to a method and mobile terminal for providing accurate and timely uplink scheduling information from the mobile terminal to a scheduler in a wireless telecommunication system.

The following acronyms are used in the description herein:
3GPP Third Generation Partnership Project
BS Buffer Size
BSR Buffer Status Reports
CBRA Contention-Based Random Access
CE Control Element
CQI Channel Quality Indicator
C-RNTI Cell-specific Radio Network Temporary Identifier
DRB Data Radio Bearer
D-SR Dedicated resources for Scheduling Request
eNB eNodeB
E-UTRA Evolved UMTS Radio Access
GBR Guaranteed Bit Rate
HOF Handover Failure
LCG Logical Channel Group
LCH Logical Channel
LCID Logical Channel Identifier
LTE Long Term Evolution
MAC Media Access Control
PBR Prioritized Bit Rate
PDCCH Physical Downlink Control Channel
PDU Packet Data Unit
PUCCH Physical Uplink Control Channel
PUSCH Physical Uplink Shared Channel
QoS Quality of Service
RA Random Access
RAR Random Access Response
RA-SR Random Access-based Scheduling Request
RB Resource Block or Radio Bearer
RBG Radio Bearer Group
RLC Radio Link Control
RLF Radio Link Failure
RRC Radio Resource Control
SDU Service Data Unit
SR Scheduling Request
SRB Signaling Radio Bearer
SRS Sounding Reference Signals
TB Transport Block
TTI Transmission Time Interval
UE User Equipment
UL-SCH Uplink Shared Channel
UTRAN UMTS Terrestrial Radio Access Network In 3GPP, work is ongoing on specifications of the evolved UTRAN (E-UTRA) as part of the Long Term Evolution (LTE) effort. The 3GPP technical specification TS 36.321 v8.3.0 (LTE MAC) describes uplink information for scheduling for LTE systems. The 3GPP technical specification TS 36.331 v8.3.0 (LTE RRC) describes procedures including handover and Radio Resource Connection (RRC) Connection Re-establishment. Both documents are incorporated herein by reference in their entirety.

In LTE, scheduling is modeled in the Medium Access Control (MAC) layer and is performed by a scheduler residing in the eNodeB (eNB). The scheduler assigns radio resources, also called Resource Blocks (RBs), for the downlink (assignments) as well as for the uplink (grants) using the Physical Downlink Control Channel (PDCCH). To assist downlink scheduling decisions in the eNB, the mobile terminal or User Equipment (UE) can be configured to transmit Channel Quality Indicator (CQI) reports on a configured resource (PUCCH) or on a dedicated resource (PUSCH). CQI reports are typically based on Sounding Reference Signals (SRS). The scheduler uses the CQI information to perform fast channel dependent link adaptation and to change allocations in the time and frequency domains.

For uplink scheduling, the eNB needs information about the current state of the buffers in the UE, i.e., how much, if any, data the UE has in its priority queues. Precise and up-to-date scheduling information enables the scheduler to make more accurate scheduling decisions, and can help to optimize the use of radio resources and to improve capacity. The 3GPP technical specification TS 36.321 specifies a framework for the UE to report to the eNB, the amount of data stored in its buffers for transmission. The eNB uses these Buffer Status Reports (BSRs) to allocate resources to the UE, and to prioritize resource allocation between different UEs. The UE triggers a Regular BSR and a Scheduling Request (SR) when uplink data becomes available for transmission and the data either belongs to a radio bearer (logical channel) group with higher priority than those for which data already existed in the buffer, or when the UE buffers were empty just before this new data became available for transmission. With this type of triggering, the scheduler can quickly be made aware when data with higher priority is available for transmission, without excessive reporting.

However, the accuracy of the information provided by the UE is limited by the granularity of the BSRs, by the frequency of the BSR transmissions, and by the delay between the arrival of data and the processing of the BSR received by the eNB. With insufficient or inaccurate uplink information, the scheduler is likely to provide either a grant which is too large (which then results in the UE transmitting padding and may reduce system capacity) or a grant which is too small (which may lead to RLC segmentation and increased transmission delay).

Uplink BSRs are transmitted using MAC signaling. As noted in 3GPP TS 36.300, uplink BSRs are needed to provide support for QoS-aware packet scheduling. In E-UTRA, uplink BSRs refer to the data that is buffered for a logical channel group (LCG) in the UE. Four LCGs and two formats are used for reporting in the uplink:
    a short format for which only one BSR (of one LCG) is reported; and a long format for which all four BSRs (of all four LCGs) are reported.

When the UE receives a grant for a new transmission on the Uplink Shared Channel (UL-SCH), the decision of how much data to transmit from each logical channel, i.e. the uplink prioritization, is performed in two rounds. In the first round, logical channels are served in a decreasing priority order up to their configured Prioritized Bit Rate (PBR) or until the data available for transmission for that logical channel is exhausted. Note that both Guaranteed Bit Rate (GBR) and non-GBR bearers may be allocated a PBR. In the second round, the logical channels are served in priority order until the data available for transmission for that logical channel is exhausted or until the received grant is exhausted. This provides a way to solve starvation issues because eNBs can configure the PBR of the higher priority logical channel in such a way that not all the UL resources are taken.

Whenever the transport block size is larger than the amount of data available for transmission at the time of assembly of the MAC PDU for transmission, a BSR known as a padding BSR can also be included. In the padding BSR case, a truncated format is also available whenever the terminal has data for more than one logical channel group but the MAC PDU only has room for a BSR format that is restricted to information about one logical channel group. Another type of BSR defined in TS 36.321, the Periodic BSR, provides a timer-based trigger per UE to handle reporting for continuous flows.

The BSR is defined as a MAC Control Element (CE). The BSR CE consists of either a short or truncated BSR format containing one Logical Channel Group (LCG) ID field and one corresponding Buffer Size (BS) field, or a long BSR format containing four BS fields corresponding to LCG IDs #1 through #4.

FIG. 1A is an illustrative drawing of the short or truncated BSR format 10.

FIG. 1B is an illustrative drawing of the long BSR format 15.

FIG. 2 is an illustrative drawing of an existing MAC Packet Data Unit (PDU) 20 as defined in the 3GPP technical specification TS 36.321. The MAC PDU consists of a MAC header 21, zero or more MAC Service Data Units (MAC SDUs) 22, zero or more MAC Control Elements (CEs) 23, and optional padding 24. Both the MAC header and the MAC SDUs are of variable sizes. The MAC PDU header consists of one or more MAC PDU sub-headers 25, each sub-header corresponding to either a MAC SDU, a MAC CE, or padding.

A MAC PDU sub-header consists of the six header fields R/R/E/LCID/F/L, except for the last sub-header in the MAC PDU and for fixed sized MAC CEs. The last sub-header in the MAC PDU and sub-headers for fixed sized MAC CEs consist solely of the four header fields R/R/E/LCID. It follows that a MAC PDU sub-header 26 corresponding to padding consists of the four header fields R/R/E/LCID.

FIG. 3A is an illustrative drawing of two versions of a MAC PDU sub-header with six header fields R/R/E/LCID/F/L. The first version 31a includes a 7-bit L field. The second version includes a 15-bit L field.

FIG. 3B is an illustrative drawing of a MAC PDU sub-header 32 with four header fields R/R/E/LCID.

MAC PDU sub-headers have the same order as the corresponding MAC SDUs, MAC CEs, and padding. MAC CEs are always placed before any MAC SDU. Padding occurs at the end of the MAC PDU, except when single-byte or two-byte padding is required but cannot be achieved by padding at the end of the MAC PDU. When single-byte or two-byte padding is required but cannot be achieved by padding at the end of the MAC PDU, one or two MAC PDU sub-headers corresponding to padding are inserted before the first MAC PDU sub-header corresponding to a MAC SDU. If such a sub-header is not present, one or two MAC PDU sub-headers corresponding to padding are inserted before the last MAC PDU sub-header corresponding to a MAC CE. A maximum of one MAC PDU can be transmitted per Transport Block (TB) per UE.

The BSR MAC Control Element reports the amount of data in the buffers for one (short format) or four (long format) Logical Channel Groups (LCGs), i.e., for one Radio Bearer Group (RBG). The short BSR format is 1 byte, and the long format is 3 bytes. Assuming that the MAC header requires only a Logical Channel ID (LCID) and E field, and that the L field can be omitted because the BSR CE has a fixed length, these 6 bits lead to one additional byte in the MAC header and thus the total overhead for each MAC PDU that carries a BSR is 2 bytes or 4 bytes, respectively.

In LTE systems, a Signaling Radio Bearer (SRB) or a Data Radio Bearer (DRB) corresponds to one logical channel (LCH). One or more LCHs are mapped to a LCH group (LCG). LCHs are then configured or associated with priorities. The LCH priority has at least two purposes. For uplink scheduling information, the LCH priority determines whether or not a BSR is triggered. For uplink data transmissions, the LCH priority determines the order in which data is extracted from the UE's buffer and included in the MAC PDU for transmission.

When new data becomes available while the UE has empty buffers, or if this data belongs to a LCH with higher priority than LCHs for which data is already buffered in the UE, a Regular BSR is triggered. Depending of the format used, the BSR reports the state of the UE's buffer for one or more LCGs, i.e., the amount of data available for transmission in each reported LCG.

When a Regular BSR is triggered, a SR is also triggered. If the UE has dedicated resources for SR (D-SR) on the PUCCH, the UE utilizes the D-SR. Otherwise the UE performs a Random Access-based SR (RA-SR). An SR is pending until it is cancelled; an SR can be cancelled, for example, in the Transmission Time Interval (TTI) for which the UE receives a grant, or in the TTI for which the UE has a UL-SCH resource available for a new transmission, or in the TTI for which the UE assembles the MAC PDU for transmission.

When the UE's need to access the system is not known by the network and thus the UE does not have a dedicated preamble, the UE must perform a Contention-Based Random Access (CBRA) to access the system. The CBRA is performed in four steps. First, the terminal transmits a Random Access (RA) preamble; second, the UE receives an RA response (RAR) with an uplink grant; third, the UE makes a first uplink transmission (MSG3); and fourth, contention is resolved only when the UE receives a grant for a new uplink transmission addressed to its Cell-specific Radio Network Temporary Identifier (C-RNTI).

SUMMARY

The present invention provides a method and mobile terminal for providing accurate and timely uplink scheduling information, which overcomes the shortcomings of the prior art.

In LTE systems, when the UE performs a handover or re-establishes the RRC connection, the MAC is reset. When the MAC is reset, the buffer status reporting state is also reset. For the handover procedure or for the re-establishment procedure to successfully complete, the first step after the MAC reset is for the UE to perform an RA-SR for the transmission of data (typically an RRC message) on the Signaling Radio Bearer (SRB).

The present invention addresses four problems associated with existing procedures. First is the delay of transmission of SRB data in the target cell at handover. Second is the inaccuracy of BSR information at RRC connection re-establishment. Third is SR pollution as a consequence of service with a constant packet rate. And fourth is limited usefulness of BSR information during the Contention-Based Random Access procedure.

Regarding the delay of transmission of SRB data in the target cell at handover, there may already be data available for transmission for DRBs. This data is considered available for transmission immediately after the MAC reset, and thus will trigger a regular BSR and an SR (RA-SR). In case the MAC layer has not received the data on SRB, data from a DRB may be transmitted and delay SRB transmission.

Regarding the inaccuracy of BSR information at RRC connection re-establishment, DRBs are suspended until the completion of the procedure. DRBs are restarted upon successful reconfiguration of radio resources following the completion of the re-establishment procedure. In this case, after the MAC reset, when data becomes available for a SRB, a BSR will be triggered. However, it is currently unclear in TS 36.321 whether data from a suspended DRB is considered available for transmission for the purpose of buffer status reporting, or whether the BSR includes information for a suspended DRB. If data from a suspended DRB is considered available for transmission for the purpose of buffer status reporting, DRBs might trigger an RA-SR while the SRB data is not yet ready for transmission, leading to an unnecessary RA-SR. If not, data for suspended DRBs will not be included in the BSR triggered by new data coming from the SRB.

Regarding SR pollution as a consequence of service with a constant packet rate, if the UE buffer state alternates between the "empty" and "new data arrival" states periodically (for example, due to services with known inter-packet arrival rates such as VoIP or due to background traffic) and the UE has no D-SR resource, the UE is forced to periodically perform an RA-SR.

Regarding the limited usefulness of BSR information during CBRA, it is noted that the CBRA procedure is utilized in case of handover, handover failure (HOF) recovery, or radio link failure (RLF) recovery. At this time the identity of the UE is not yet known by the network. Thus, if a BSR is transmitted together with the RA MSG3, the BSR information may not be useful and may delay more urgent information.

It would be desirable to have a mechanism that determines whether or not to trigger an SR depending on whether an LCH that triggers a BSR has a specific priority, or depending on the state of the LCH, while ensuring that the Signaling Radio Bearer (SRB) message is still transmitted with highest priority. The determination may be made either during a certain period of time (for example, based on an ongoing procedure or other state) or permanently (for example, based on configuration). It is also desirable for the mechanism to ensure that the BSR information included in the transmission is both accurate and useful. The present invention provides a solution to the aforementioned problems.

An embodiment of the invention provides UE behavior in which the decision of whether to trigger an SR is based on at least one of: the priority/priorities associated with the LCH(s) associated with the LCG that triggered the BSR, or the state of the LCH(s) associated with the LCG (suspended/active).

In addition, the decision of whether to include buffer status information in a transmission for one or more of the LCGs is based on at least one of: the priority associated with the LCH or LCG that triggered the BSR, or its state (suspended/active), or the type of random access being performed (contention-based or not).

In one embodiment, the present invention is directed to a method in a mobile terminal for providing uplink scheduling information to a scheduler in a wireless telecommunication system. The method includes the steps of receiving information regarding a logical channel group having a logical channel that has triggered a buffer status report, the logical channel having a priority level associated therewith and having data available for transmission; and determining whether the priority level associated with the logical channel exceeds a predefined threshold. Upon determining that the priority level exceeds the predefined threshold, the mobile terminal performs a scheduling request procedure with the scheduler. Upon determining that the priority level does not exceed the predefined threshold, the mobile terminal delays the scheduling request procedure until a predefined timing event has occurred.

Alternatively, the scheduling request procedure may be triggered by a priority level assigned to the logical channel group rather than an individual logical channel. The priority of the logical channel group may be equal to the priority of the logical channel with highest priority within the logical channel group. Alternatively, the priority of the logical channel group may be assigned independent of the priorities of the associated logical channels, for example, by means of a dedicated configuration with explicit signaling.

Another embodiment of the method includes the steps of receiving information regarding a logical channel group having a logical channel that has triggered a buffer status report; determining whether a radio bearer associated with the logical channel is active or suspended; upon determining that the radio bearer associated with the logical channel is active, performing a scheduling request procedure with the scheduler; and upon determining that the radio bearer associated with the logical channel is suspended, delaying the scheduling request procedure until the radio bearer becomes active.

Another embodiment of the method includes the steps of determining that a logical channel in a logical channel group has triggered a scheduling request procedure; and determining whether the scheduling request procedure is being performed using a contention-based random access. Upon determining that the scheduling request procedure is not being performed using a contention-based random access, performing the scheduling request procedure with the scheduler, wherein the scheduling request procedure includes transmitting buffer status reporting information. Upon determining that the scheduling request is being performed using a contention-based random access, the mobile terminal determines whether contention resolution has succeeded for the mobile terminal. If contention resolution has not succeeded for the mobile terminal, the mobile terminal performs the scheduling request procedure without transmitting the buffer status reporting information.

In another embodiment, the present invention is directed to a mobile terminal for providing uplink scheduling information to a scheduler in a wireless telecommunication system. The mobile terminal includes means for determining a priority level associated with a logical channel of a logical channel group, wherein the logical channel has triggered a buffer status report; means for determining whether the priority level associated with the logical channel exceeds a predefined threshold; means for performing a scheduling request procedure with the scheduler whenever the priority level exceeds the predefined threshold; and means for delaying the scheduling request procedure until a predefined timing event has occurred whenever the priority level does not exceed the predefined threshold.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

It should be noted that under existing LTE specifications, an SR is triggered only when a Regular BSR is triggered. Although various embodiments of the present invention described below assume that an SR is triggered as a consequence of a BSR trigger, it should be understood that each of these embodiments is equally applicable to other events that could also trigger an SR.

Those skilled in the art will understand that the UE always transmits a BSR on UL-SCH resources in a TTI for which the UE has a granted UL-SCH resource. An SR transmitted on the PUCCH is a different transmission on a different physical channel and in a different TTI, and never includes a BSR. However, an SR performed using random access (RA-SR) is performed on the UL-SCH, and thus under existing procedures for CBRA, could include a BSR before the CBRA contention is successful. One aspect of the present invention prevents the UE from transmitting the BSR until CBRA contention is successful.

Figure 1A:
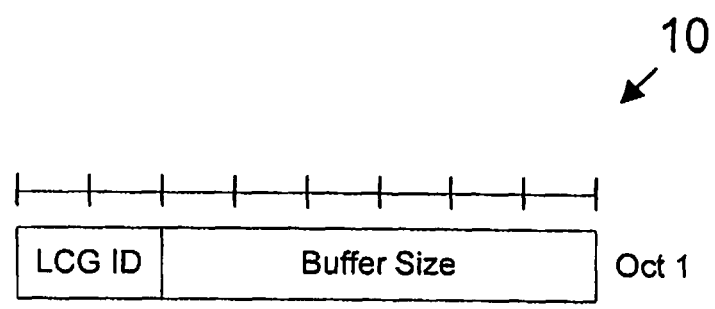
FIG. 1A is an illustrative drawing of an existing short or truncated BSR format.
Figure 1B:
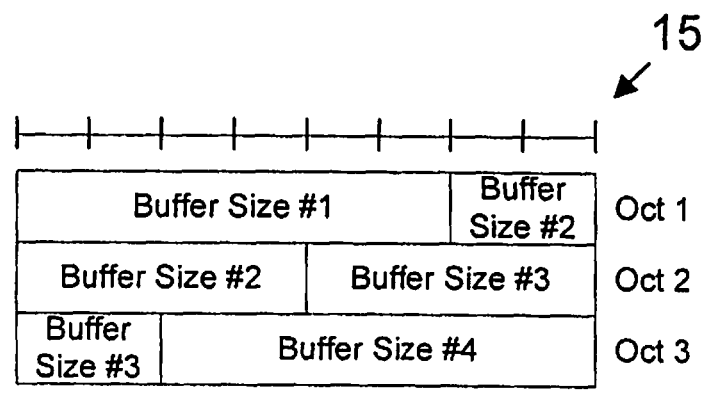
FIG. 1B is an illustrative drawing of an existing long BSR format.
Figure 2:
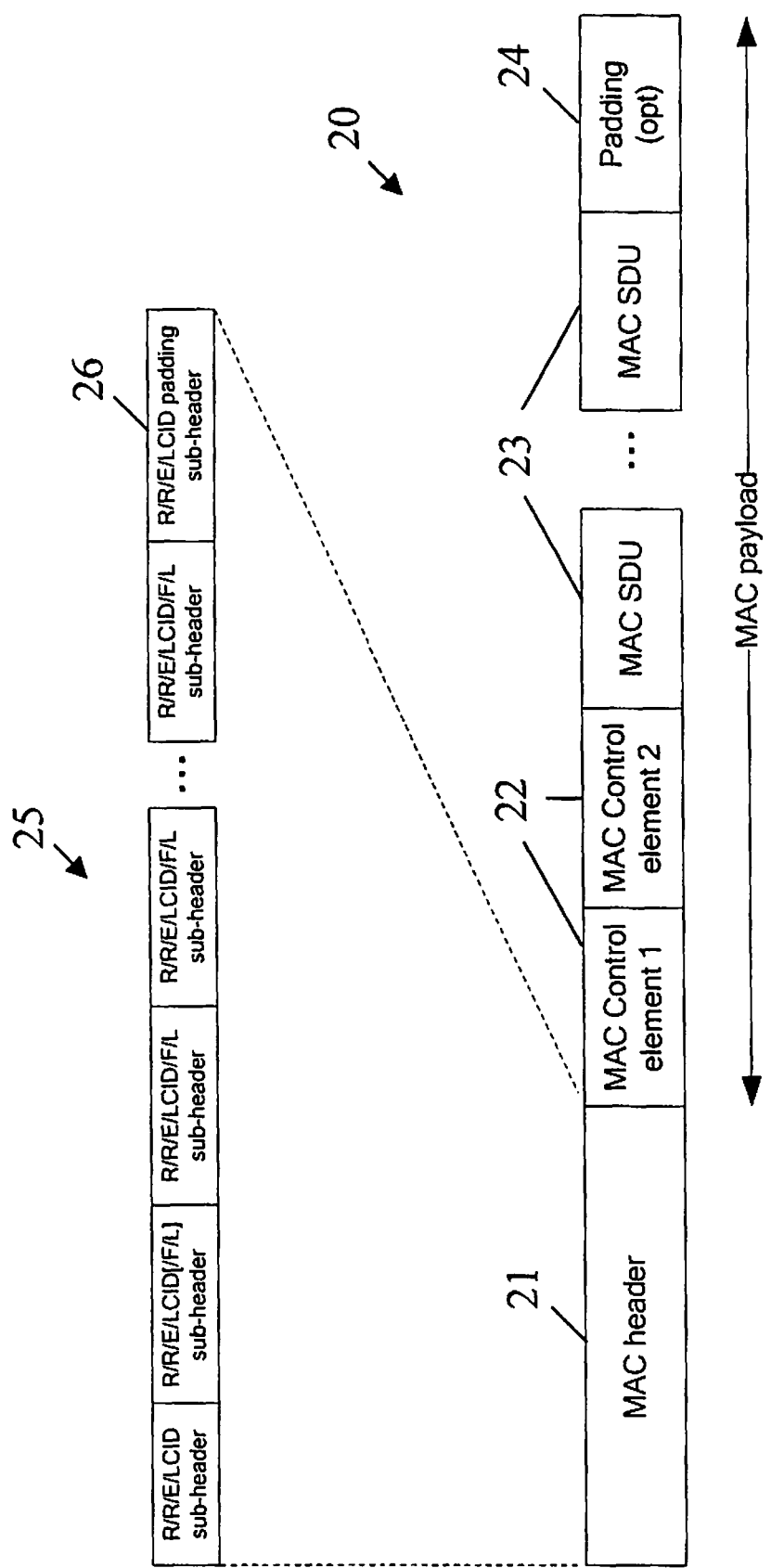
FIG. 2 is an illustrative drawing of an existing MAC Packet Data Unit (PDU)
Figure 3A:
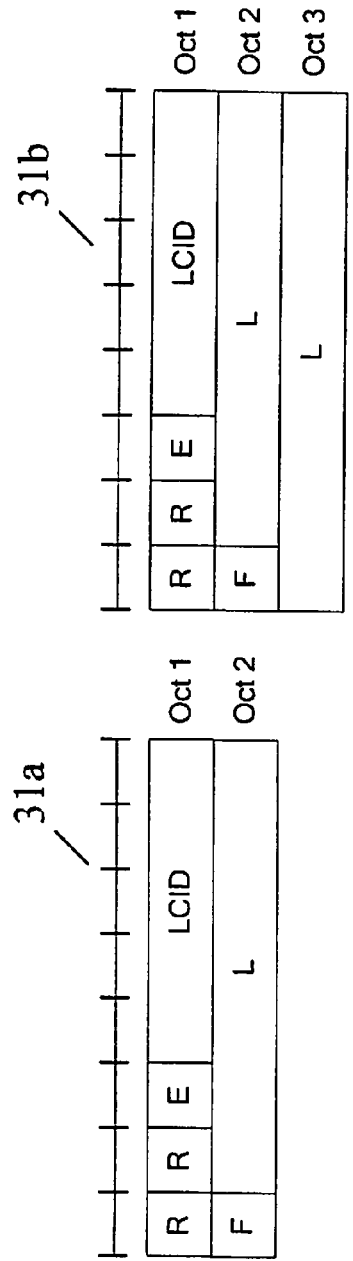
FIG. 3A is an illustrative drawing of two existing versions of a MAC PDU sub-header with six header fields.
Figure 3B:
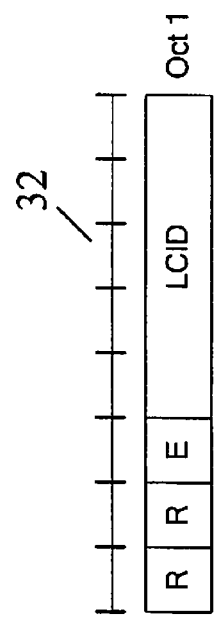
FIG. 3B is an illustrative drawing of an existing MAC PDU sub-header with four header fields.
Figure 4:
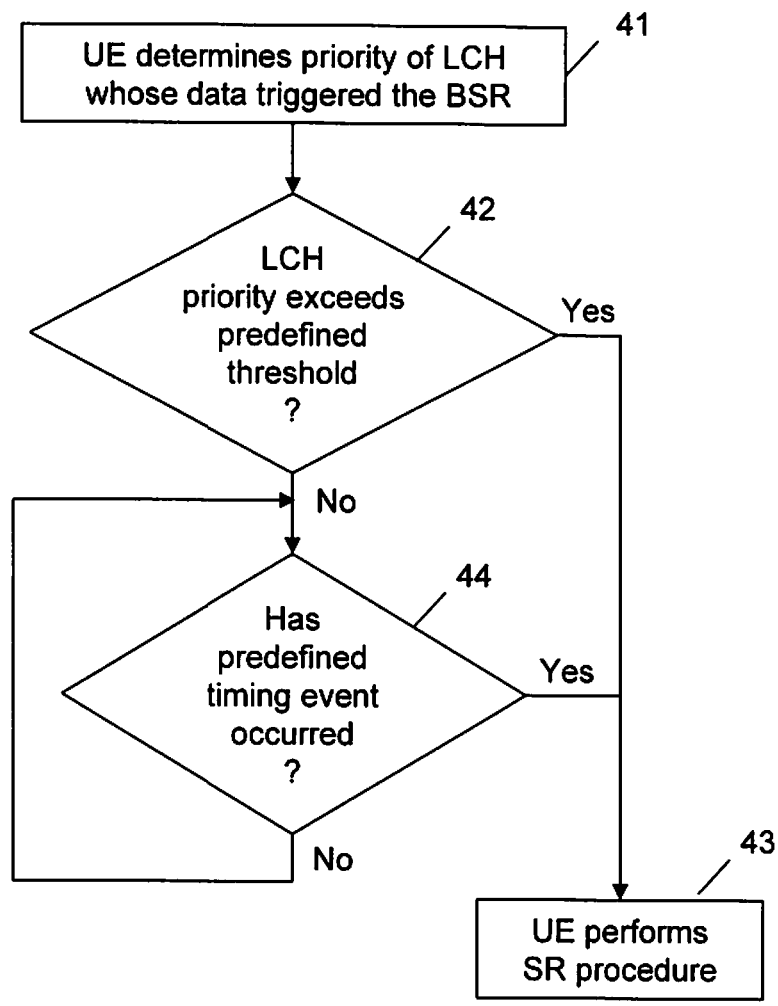
FIG. 4 is a flow chart of the steps of a first exemplary embodiment of the method of the present invention.

FIG. 4 is a flow chart of the steps of a first exemplary embodiment of the method of the present invention. In this embodiment, during a predetermined time period, an SR is triggered only if an LCH with data available for transmission has a priority higher than a predefined threshold. For example, the priority of the LCH must be higher than "no priority" or "low priority" or else an SR is not triggered during the predetermined time period. This may occur either because the LCG does not trigger a BSR, or the LCG triggers a BSR that does not trigger an SR during the determined time period. The time period may be based on another procedure, for example, starting after a MAC reset and until data becomes available for transmission for an LCH with higher priority.

At step 41, the UE determines the priority of the LCH whose data triggered the BSR. At step 42, the UE determines whether the priority of that LCH exceeds a predefined threshold. If so, the method moves to step 43 where the UE triggers the SR. However, if there is no LCH with data available for transmission for which the priority is higher than the predefined threshold, the method moves to step 44 where the UE determines whether a predefined timing even has occurred. This may involve waiting until a timer has expired, or until an event occurs such as data becoming available for an SRB following MAC reset at handover or due to an HOF/RLF recovery procedure. If the timing event has not occurred, the UE waits for the event to occur before moving to step 43 and triggering the SR.

This embodiment includes the specific scenario in which the MAC is reset at handover or due to an HOF/RLF recovery procedure. DRB data may be immediately considered available for transmission (for example, for the purpose of BSR), but an SR is first triggered only when data becomes available for an SRB.

This embodiment also includes the specific scenario in which the LCHs within an LCG are configured with no priority/priorities for the purpose of SR. In other words, an LCH may be associated a priority for uplink multiplexing and for buffer status reporting, but is not considered in the decision to trigger an SR when new data becomes available for transmission for this LCG or for other LCGs.

Alternatively, the SR may be triggered by a priority level assigned to the LCG itself rather than an individual LCH. The priority of the LCG may be equal to the priority of the LCH with highest priority within the LCG. Alternatively, the priority of the LCG may be assigned independent of the priorities of the associated LCHs, for example, by means of a dedicated configuration with explicit signaling. LCG priorities may be used, under certain circumstances, to suppress reporting (and potentially transmission) of data of a certain class (or classes) of LCHs irrespective of the LCH data prioritization mechanism used during normal operation.

Figure 5:
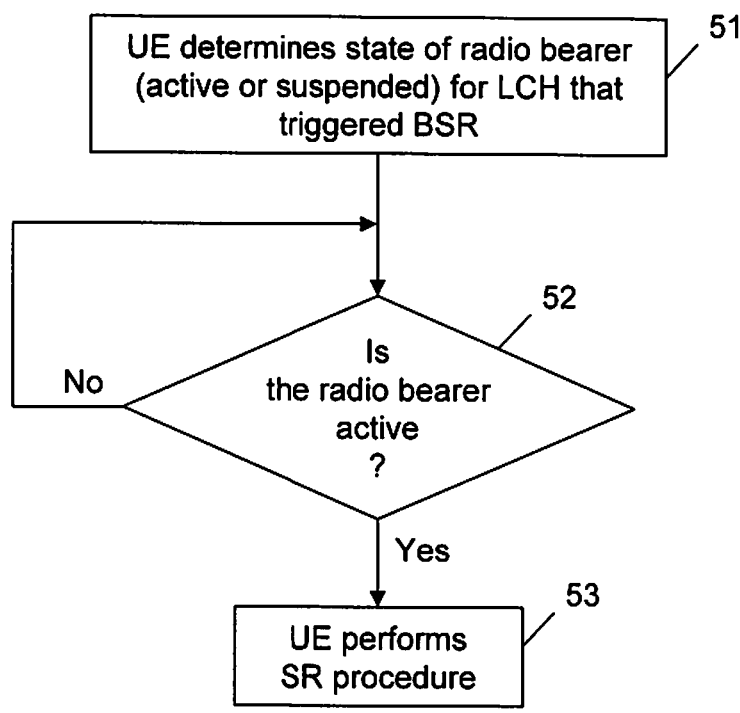
FIG. 5 is a flow chart of the steps of a second exemplary embodiment of the method of the present invention.

FIG. 5 is a flow chart of the steps of a second exemplary embodiment of the method of the present invention. In this embodiment, the LCG does not trigger an SR while its radio bearers are suspended. This may occur either because the LCG does not trigger a BSR, or the LCG triggers a BSR that does not trigger an SR. This embodiment includes the specific scenario in which the MAC is reset due to an HOF/RLF recovery procedure. All buffered data is considered immediately available for transmission (for example, for the purpose of BSR) even for suspended radio bearers (typically DRBs), but an SR is first triggered for an LCG when data becomes available on one of the LCHs associated with the LCG, given the LCH is not suspended (typically SRBs).

At step 51, the UE determines the state of the radio bearer (i.e., active or suspended) associated with the LCH that triggered the BSR. At step 52, the UE waits for the bearer to become active. When the bearer is active, the method moves to step 53 where the UE performs the SR procedure.

Figure 6:
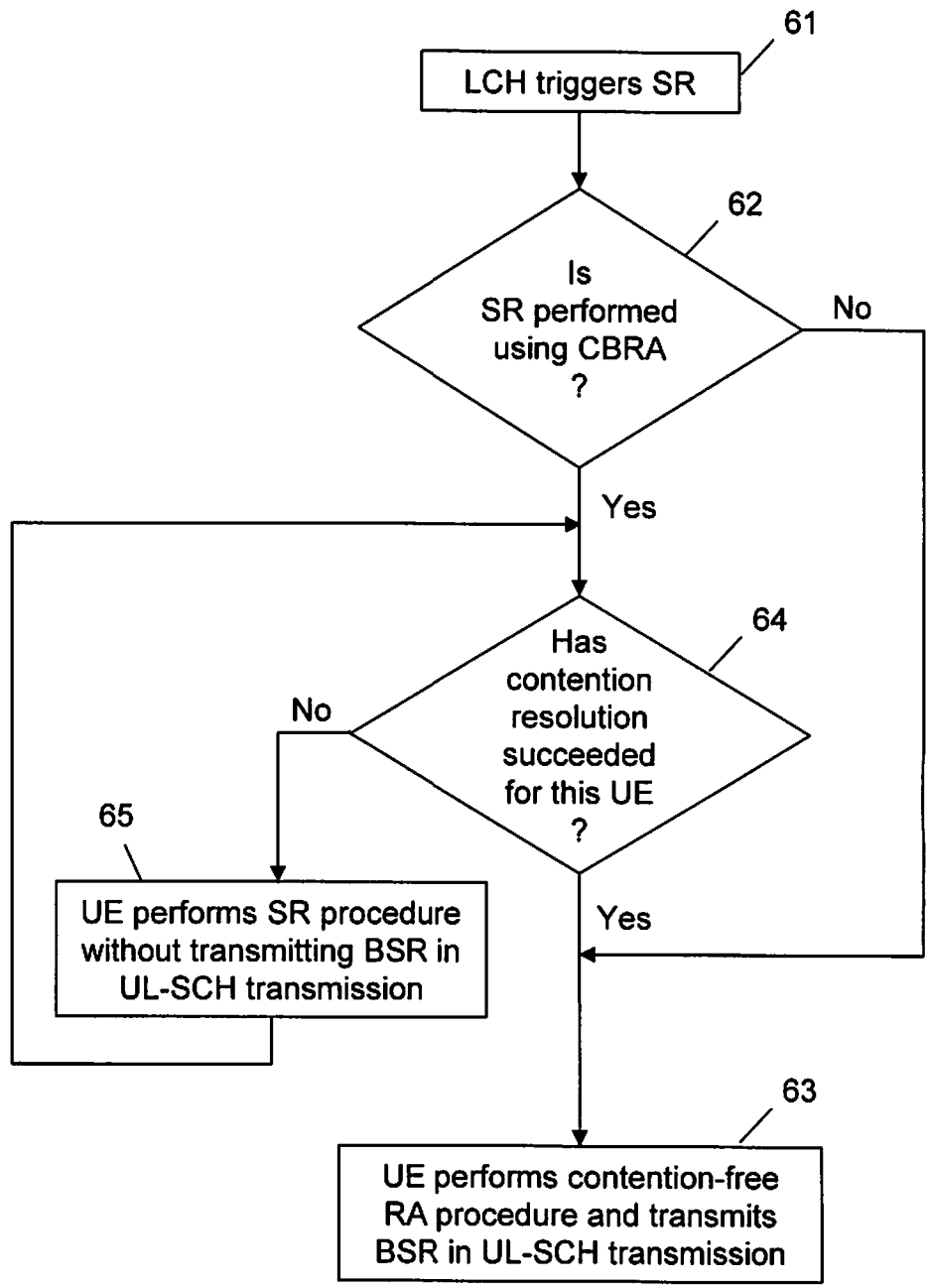
FIG. 6 is a flow chart of the steps of a third exemplary embodiment of the method of the present invention.

FIG. 6 is a flow chart of the steps of a third exemplary embodiment of the method of the present invention. In this embodiment, if the LCG includes an LCH that triggers an SR, and this SR is performed using CBRA, a pending BSR shall not be included in the transmission (for example, a MAC PDU) before the contention resolution succeeds for this UE. This embodiment may be applied to all CBRAs, or may be applied only to CBRAs performed due to RLF or HOF recovery.

At step 61, an LCH in the LCG triggers an SR. At step 62, the UE determines whether the SR is performed using CBRA. If not, the method moves to step 63 where the UE performs a contention-free random access procedure. The UE transmits a preamble transmission in the uplink, receives a random access response (RAR) with a grant and UE identity in the downlink, and then performs a normal UL-SCH transmission using the grant received in the RAR. This transmission includes the BSR. However, if the UE determines at step 62 that the SR is performed using CBRA, the method moves to step 64 where the UE determines whether contention resolution has succeeded for this UE. If not, the method moves to step 65 where the UE performs the SR procedure but does not transmit the pending BSR in the UL-SCH transmission. If the contention resolution has succeeded for this UE, the method moves to step 63 where the UE performs the contention-free random access procedure in which the UE transmits the BSR in the UL-SCH transmission. It should be understood that the UE transmits the BSR in a TTI for which the UE has a granted UL-SCH resource.

Figure 7:
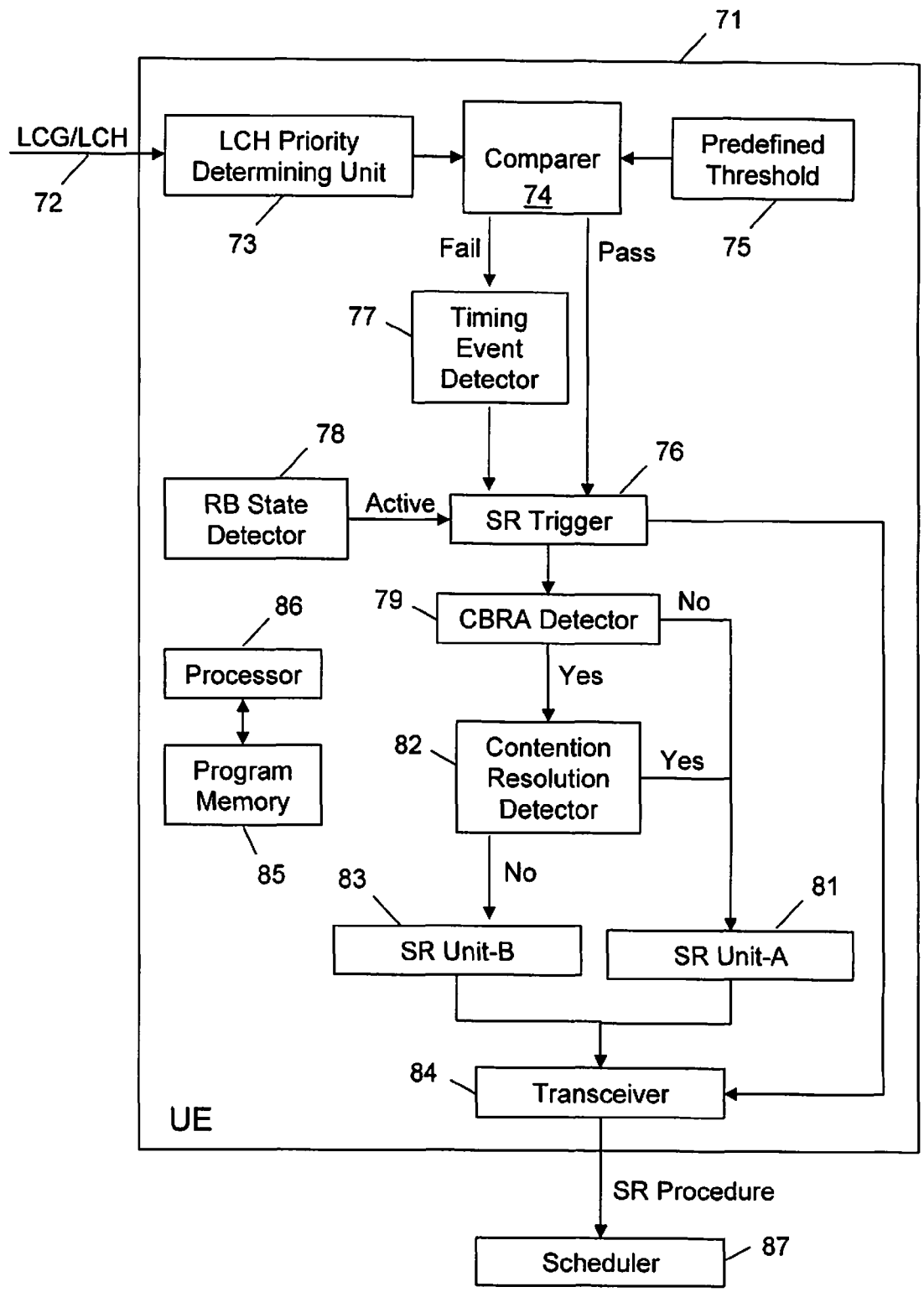
FIG. 7 is a simplified block diagram of a UE modified in accordance with the teachings of the present invention.

FIG. 7 is a simplified block diagram of a UE 71 modified in accordance with the teachings of the present invention. When the UE receives LCG/LCH information 72, a priority determining unit 73 determines the priority of the LCHs in the LCG and sends the priority information to a comparer 74. The comparer compares the priority of the LCHs with a predefined threshold 75 (for example, a priority threshold higher than low priority). If the priority of any of the LCHs passes the threshold, a passing indication is sent to an SR trigger 76. The SR trigger may trigger the UE to perform an SR procedure utilizing a transceiver 84. The UE may transmit the SR on a UE-dedicated resource on the PUCCH (D-SR) if such a resource has been configured by RRC. Otherwise, the contention-free random-access procedure (RA-SR) described above is utilized. If none of the LCHs has a priority that passes the threshold, a failure indication is sent to a timing event detector 77. The timing event detector may be as simple as a timer, or may be a detector configured to detect an event such as when data becomes available for an SRB following MAC reset at handover or due to an HOF/RLF recovery procedure. When the timing event is detected, an indication is sent to the SR trigger 76. In this manner, the UE implements the embodiment of the present invention illustrated in FIG. 4.

An RB state detector 78 detects whether the radio bearer for the LCH that triggered the BSR is in active or suspended state. When the radio bearers move from suspended to active state, the RB state detector sends an indication to the SR trigger. In this manner, the UE implements the embodiment of the present invention illustrated in FIG. 5.

The SR trigger 76 indicates the triggering of an SR to a CBRA detector 79. The CBRA detector determines whether the SR is performed using CBRA. If not, the CBRA detector sends an indication to an SR Unit-A 81, which triggers the contention-free random access procedure in which the UE transmits a preamble transmission in the uplink, receives an RAR with a grant and UE identity in the downlink, and then performs a normal UL-SCH transmission using the grant received in the RAR. This transmission includes the pending BSR. The UE transmits the pending BSR in a TTI for which the UE has a granted UL-SCH resource. If the CBRA detector determines that the SR is performed using CBRA, the CBRA detector sends an indication to a contention resolution detector 82, which determines whether contention resolution has succeeded for the UE 71. If so, the contention resolution detector sends an indication to the SR Unit-A 81, which triggers the UE to perform the contention-free random access procedure in which the UE transmits the BSR in the UL-SCH transmission. Again, the UE transmits the pending BSR utilizing its granted UL-SCH resource. If the contention resolution has not succeeded for this UE, the contention resolution detector sends an indication to an SR Unit-B 83, which triggers the UE to perform the SR procedure without transmitting the pending BSR in the UL-SCH transmission. A transceiver 84 transmits signals in the uplink to the scheduler 87 and receives signals in the downlink from the scheduler. In this manner, the UE implements the embodiment of the present invention illustrated in FIG. 6.

It should be understood that the functionalities of the UE 71 may be implemented by hardware, firmware, and/or by software program instructions stored on a program memory 85 and run on a processor 86.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a mobile terminal for providing uplink scheduling information to a scheduler in a wireless telecommunication system, said method comprising the steps of:
receiving information regarding a logical channel group having a logical channel that has triggered a buffer status report, the logical channel having a priority level associated therewith and having data available for transmission;
determining whether the priority level associated with the logical channel exceeds a predefined threshold;
upon determining that the priority level exceeds the predefined threshold, performing a scheduling request procedure with the scheduler; and
upon determining that the priority level does not exceed the predefined threshold, delaying the scheduling request procedure until a predefined timing event has occurred;
wherein the scheduling request procedure includes transmitting the buffer status report;
wherein the scheduling request procedure is being performed using a contention-based random access, and the step of delaying the scheduling request procedure until a predefined timing event has occurred includes delaying the transmission of the buffer status report until contention resolution has succeeded for the mobile terminal.

2. The method according to claim 1, wherein the step of delaying the scheduling request procedure until a predefined timing event has occurred includes delaying the scheduling request procedure until radio bearers associated with the logical channel group are active.

3. A method in a mobile terminal for providing uplink scheduling information to a scheduler in a wireless telecommunication system, said method comprising the steps of:
receiving information regarding a logical channel group having a logical channel that has triggered a buffer status report;
determining whether a radio bearer associated with the logical channel is active or suspended;
upon determining that the radio bearer associated with the logical channel is active, performing a scheduling request procedure with the scheduler; and
upon determining that the radio bearer associated with the logical channel is suspended, delaying the scheduling request procedure until the radio bearer becomes active;
wherein the scheduling request procedure includes transmitting the buffer status report;
wherein the scheduling request procedure is being performed using a contention-based random access, and the step of delaying the scheduling request procedure until a predefined timing event has occurred includes delaying the transmission of the buffer status report until contention resolution has succeeded for the mobile terminal.

4. A method in a mobile terminal for providing uplink scheduling information to a scheduler in a wireless telecommunication system, said method comprising the steps of:
- determining that a logical channel in a logical channel group has triggered a scheduling request procedure;
- determining whether the scheduling request procedure is being performed using a contention-based random access;
- upon determining that the scheduling request procedure is not being performed using a contention-based random access, performing the scheduling request procedure with the scheduler, wherein the scheduling request procedure includes transmitting buffer status reporting information;
- upon determining that the scheduling request procedure is being performed using a contention-based random access, determining whether contention resolution has succeeded for the mobile terminal; and
- upon determining that contention resolution has not succeeded for the mobile terminal, performing the scheduling request procedure without transmitting the buffer status reporting information;
- wherein the scheduling request procedure includes transmitting the buffer status report;
- wherein the scheduling request procedure is being performed using a contention-based random access, and the step of delaying the scheduling request procedure until a predefined timing event has occurred includes delaying the transmission of the buffer status report until contention resolution has succeeded for the mobile terminal.

5. The method according to claim 4, further comprising, upon determining that contention resolution has succeeded for the mobile terminal, the step of transmitting the buffer status reporting information.

6. A mobile terminal for providing uplink scheduling information to a scheduler in a wireless telecommunication system, said mobile terminal comprising:
- means for determining a priority level associated with a logical channel of a logical channel group, wherein the logical channel has triggered a buffer status report;
- means for determining whether the priority level associated with the logical channel exceeds a predefined threshold;
- means for performing a scheduling request procedure with the scheduler whenever the priority level exceeds the predefined threshold; and
- means for delaying the scheduling request procedure until a predefined timing event has occurred whenever the priority level does not exceed the predefined threshold;
- wherein the scheduling request procedure includes transmitting the buffer status report;
- wherein the scheduling request procedure is being performed using a contention-based random access, and the step of delaying the scheduling request procedure until a predefined timing event has occurred includes delaying the transmission of the buffer status report until contention resolution has succeeded for the mobile terminal.

7. The mobile terminal according to claim 6, further comprising:
- means for determining whether a radio bearer associated with the logical channel is active, wherein the scheduling request procedure is performed only if the radio bearer associated with the logical channel is active.

8. The mobile terminal according to claim 6, further comprising:
- means for determining whether the scheduling request procedure is being performed using a contention-based random access; and
- means for transmitting the buffer status report whenever the scheduling request procedure is not being performed using a contention-based random access.

9. The mobile terminal according to claim 6, further comprising:
- means for determining whether the scheduling request procedure is being performed using a contention-based random access;
- means for determining whether contention resolution has succeeded for the mobile terminal whenever the scheduling request procedure is being performed using a contention-based random access; and
- means for performing the scheduling request procedure without transmitting the buffer status report whenever contention resolution has not succeeded for the mobile terminal.

10. The mobile terminal according to claim 6, wherein the means for delaying the scheduling request procedure until a predefined timing event has occurred includes means for delaying the scheduling request procedure until at least one of the following events has occurred:
- expiration of a timer;
- a radio bearer associated with the logical channel becomes active; and
- contention resolution has succeeded for the mobile terminal whenever the scheduling request procedure is being performed using a contention-based random access.

11. A method in a mobile terminal for providing uplink scheduling information to a scheduler in a wireless telecommunication system, said method comprising the steps of:
- receiving information regarding a logical channel group that has triggered a buffer status report, the logical channel group having a priority level associated therewith and having data available for transmission;
- determining whether the priority level associated with the logical channel group exceeds a predefined threshold;
- upon determining that the priority level exceeds the predefined threshold, performing a scheduling request procedure with the scheduler; and
- upon determining that the priority level does not exceed the predefined threshold, delaying the scheduling request procedure until a predefined timing event has occurred;
- wherein the scheduling request procedure includes transmitting the buffer status report;
- wherein the scheduling request procedure is being performed using a contention-based random access, and the step of delaying the scheduling request procedure until a predefined timing event has occurred includes delaying the transmission of the buffer status report until contention resolution has succeeded for the mobile terminal.

12. The method according to claim 11, wherein the priority of the logical channel group is equal to a priority of a highest priority logical channel within the logical channel group.

13. The method according to claim 11, wherein the priority of the logical channel group is assigned independent of respective priorities of one or more logical channels within the logical channel group.

* * * * *